United States Patent
Spriggel

(10) Patent No.: US 11,828,319 B1
(45) Date of Patent: Nov. 28, 2023

(54) LOCKNUT

(71) Applicant: Daniel John Spriggel, Henderson, NV (US)

(72) Inventor: Daniel John Spriggel, Henderson, NV (US)

( * ) Notice: Subject to any disclaimer, the term of this patent is extended or adjusted under 35 U.S.C. 154(b) by 243 days.

(21) Appl. No.: 17/300,374

(22) Filed: Jun. 7, 2021

(51) Int. Cl.
*F16B 39/02* (2006.01)

(52) U.S. Cl.
CPC .................................. *F16B 39/028* (2013.01)

(58) Field of Classification Search
CPC ........ F16B 39/028; F16B 39/02; F16B 39/04; F16B 39/26; F16B 39/284
USPC ................ 411/315, 278–279, 246, 254–255, 411/191–192, 195, 199, 200, 209, 411/276–279
See application file for complete search history.

(56) References Cited

U.S. PATENT DOCUMENTS

| | | | | |
|---|---|---|---|---|
| 727,152 A * | 5/1903 | Kimball | .................. | F16B 39/04 411/946 |
| 951,800 A * | 3/1910 | Center | .................... | F16B 39/04 411/941 |
| 1,019,277 A * | 3/1912 | Rapp | ....................... | F16B 39/32 411/941 |
| 1,183,190 A * | 5/1916 | Hansell | ................... | F16B 39/02 411/929 |
| 1,377,196 A * | 5/1921 | Gillespie | ................. | F16B 39/32 411/951 |
| 1,548,165 A * | 8/1925 | Pelletier | .................. | F16B 39/32 411/200 |
| 1,901,744 A * | 3/1933 | Glover | .................... | F16B 39/32 411/933 |
| 1,963,667 A * | 6/1934 | Mercier | .................. | F16B 39/04 411/932 |
| 3,616,828 A * | 11/1971 | Jessmore | ................ | F16B 39/02 411/432 |
| 4,033,394 A * | 7/1977 | Capuano | .................. | F16B 39/02 411/278 |
| 4,504,249 A * | 3/1985 | Fortier | .................. | F16H 55/566 474/33 |
| 7,128,514 B1 * | 10/2006 | Le Beau | ............. | F16B 37/0892 411/277 |
| 7,758,274 B2 * | 7/2010 | Paul | ........................ | A61B 17/00 403/104 |
| 8,657,544 B2 * | 2/2014 | Liu | ........................ | F16B 39/36 411/266 |
| 2009/0087280 A1* | 4/2009 | Harnetiaux | ............. | F16B 39/04 411/436 |
| 2009/0154991 A1* | 6/2009 | Landwehr | ............. | F16B 35/042 411/432 |
| 2011/0064537 A1* | 3/2011 | Wrigley | ................... | A62B 9/00 128/205.24 |

(Continued)

FOREIGN PATENT DOCUMENTS

WO   WO-2019194876 A1 * 10/2019 .............. F16B 37/00

*Primary Examiner* — Victor D Batson
*Assistant Examiner* — Dil K. Magar
(74) *Attorney, Agent, or Firm* — Jack C. Munro

(57) ABSTRACT

A locknut for a threaded bolt which uses a pair of cooperating movable members that apply a three hundred and sixty degree engaging force on the threaded bolt locking the locknut to the threaded bolt. The pair of cooperating members are mounted within the body of the locknut. The locknut is the same physical size as a conventional nut that doesn't include any locking mechanism. The locknut can be loosened and reused multiple times.

8 Claims, 3 Drawing Sheets

(56) References Cited

U.S. PATENT DOCUMENTS

| | | | | |
|---|---|---|---|---|
| 2012/0170991 A1* | 7/2012 | Liu | ............... | F16B 39/36 |
| | | | | 24/700 |
| 2012/0224934 A1* | 9/2012 | Chang | ............... | B60B 3/16 |
| | | | | 411/315 |
| 2012/0282060 A1* | 11/2012 | Chung | ............... | F16B 39/028 |
| | | | | 411/310 |
| 2015/0240856 A1* | 8/2015 | Watanabe | ............... | F16B 39/028 |
| | | | | 411/1 |
| 2016/0327084 A1* | 11/2016 | Hund | ............... | F16B 39/028 |

* cited by examiner

LOCKNUT

BACKGROUND OF THE INVENTION

It is well known that nuts that are secured to threaded bolts can loosen and actually separate from the threaded bolt. The cause of the disengagement is vibration which occurs normally in all machinery.

There have been designed a wide variety of different types of locknuts. There is a test called the Junker test for nuts. All of the prior art locknuts fail this test. This test uses a vibrating platform that is severe. All prior art locknuts begin to unthread immediately after starting the test. There has not been any prior art locknut that remains secured for the entire time of the test. The locknut of this invention does remain secured and therefore passes the test.

The reason all prior art locknuts fail the Junker test is that the locking force is localized to a small portion of the threaded bolt. This localized pressure is commonly obtained by using a screw of some type that applies point pressure directly onto the bolt. In the present invention the engaging force is not a single point obtained with a screw directly contacting the bolt. A screw is used but applies pressure through a ring insert and a loading foot which then applies a 360 degree force onto the bolt.

Also most prior art locknuts are not reusable. The prior art locknuts frequently deforms when installed and cannot be reused upon the locknut being removed from the threaded bolt. The locknut of this invention can be reused hundreds or even thousands of times.

Most prior art locknuts are larger than conventional non-locking nuts. As a result these locknuts cannot be used in some environments. The locknut of this invention is the same size as conventional non-locking nuts and can be used in any environment.

Also many of the prior art locknuts include non-metallic parts such as plastic polymer inserts and cannot be used in corrosive or high temperature environments. The locknut of this invention is made entirely of metal such as stainless steel which can be used in high temperature and corrosive environments.

The cost of most prior art locknuts is substantially greater than conventional non-locking nuts. This increased cost prevents their usage in some environments. The cost of the locknut of this invention is only slightly greater than the cost of conventional nuts therefore not limiting its usage due to cost.

SUMMARY OF THE INVENTION

A locknut for a threaded bolt that uses a ring insert mounted within the nut body. The ring insert is movable laterally but not longitudinally. The threaded bolt passes through a through opening in the ring insert. A loading foot is mounted within the ring insert and is also movable laterally but not longitudinally. A set screw is threaded within a threaded hole in the ring insert. The set screw is in contact with the loading foot. Tightening the set screw causes both the ring insert and loading foot to move laterally narrowing the diameter of the through opening. This narrowing of the diameter produces a three hundred and sixty degree engaging force (locking force) on the bolt which prevents turning of the threaded bolt or locknut relative to the structure the bolt and locknut are mounted on.

DETAILED DESCRIPTION OF THE INVENTION

Figure 1:
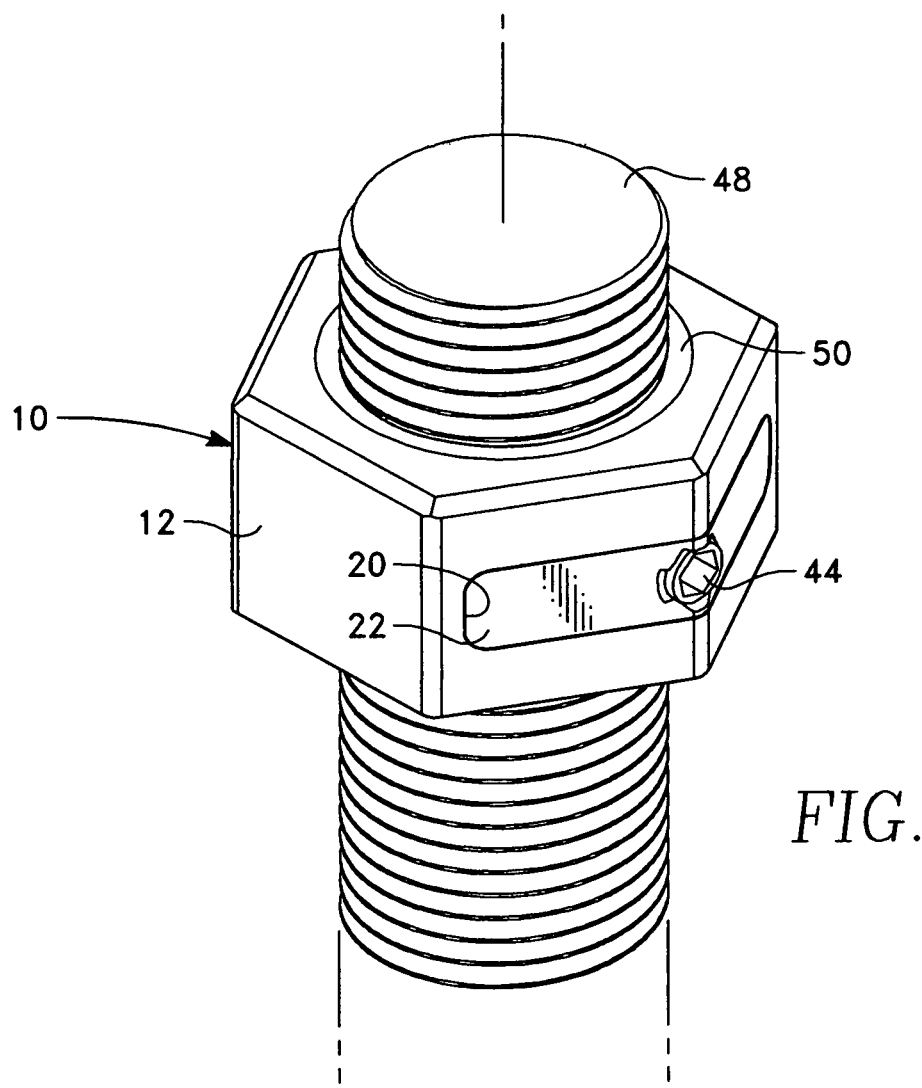
FIG. 1 is an external isometric side view of the locknut of this invention showing such installed on a threaded bolt.
Figure 2:
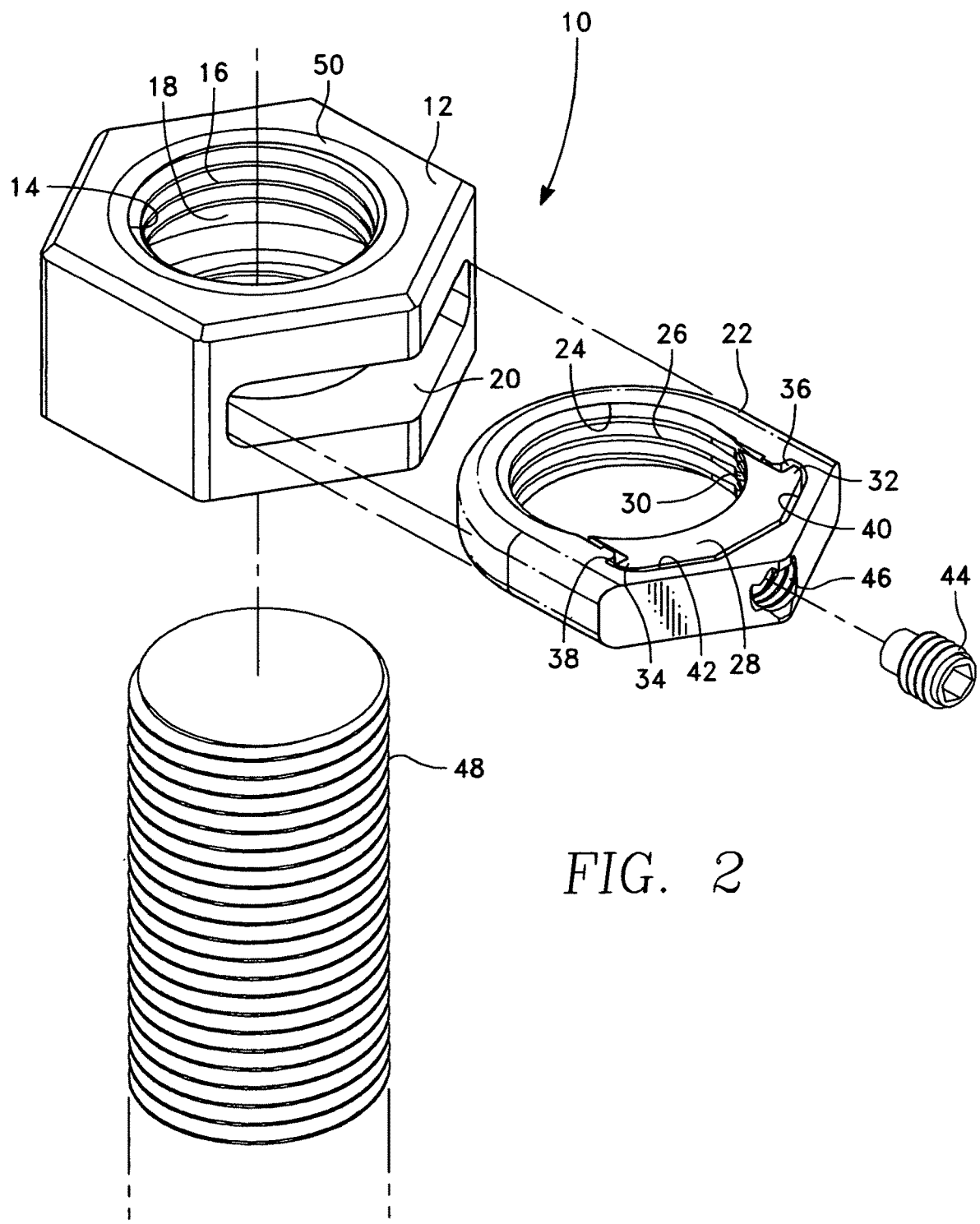
FIG. 2 is an isometric view showing the locknut disassembled and disconnected from the threaded bolt.
Figure 3:
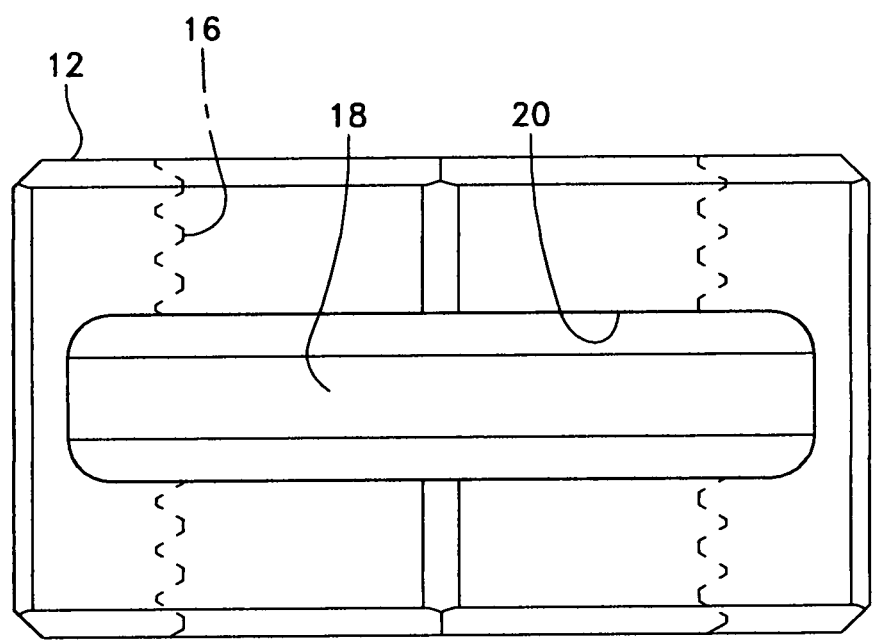
FIG. 3 is a side view of the nut body of the locknut with the ring insert removed and looking directly into the slot formed in the nut body.

Referring specifically to the Figures there is shown the locknut 10 of this invention which has a nut body 12. Nut body 12 has a through opening 14 the wall surface of which has screw threads 16. Preferably the nut body will be constructed of metal such as stainless steel. Longitudinally centrally located in the through opening 14 is a pocket 18. Access into the pocket 18 is provided by slot 20 formed in the nut body 12. The side wall of pocket 18 is smoothly contoured not containing any threads.

Insertable into the slot 20 is a ring insert 22. Ring insert 22 will also be constructed of metal such as stainless steel. Ring insert 22 has a through opening 24. The wall surface of through opening 24 includes threads 26 which are similar to threads 16. The ring insert 22 when located in pocket 18 closely fits within pocket 18 not permitting any longitudinal movement but is capable of a limited amount of lateral movement.

Mounted within through opening 24 is a loading foot 28. The ring insert and the loading foot constitute cooperating members. The inner surface of the loading foot 28 has series of screw threads 30. Screw threads 30 are in alignment with screw threads 26. The inner surface of the loading foot 28 is curved to be part of the circle which completes the circle of through opening 24. This circle can be manufactured in multiple different diameters such as one quarter of an inch, three eights of an inch, one half of an inch, five eights of an inch, three quarters of an inch, seven eights of an inch, one inch and so forth.

The side walls of the loading foot 28 include protrusions 32 and 34. Protrusion 32 is located adjacent wall 26. Protrusion 34 is located adjacent wall 38. The back side of protrusion 22 is located adjacent inclined wall surface 40 of ring insert of ring insert 22. The back side of protrusion 24 is located adjacent inclined wall surface 42 of ring insert 22. The space created between inclined wall surface 40 and wall 36 is identical to the space between inclined wall surface 42 and wall 38. The protrusions 32 and 34 are identical so protrusion 32 is capable of limited movement within this space and the same is true for protrusion 34. If protrusions 32 and 34 are located against their respective inclined wall surfaces 40 and 42 the diameter of the hole created with through opening 24 is at its maximum diameter. If protrusions 32 and 34 are located against their respective walls 36 and 38 the diameter of the hole created with the through opening 24 is at its minimum diameter.

Movement of the loading foot 28 is accomplished by set screw 44 which is threaded within threaded hole 46 formed in ring insert 22. The inner end of set screw 44 abuts against loading foot 28. Turning of set screw 44 clockwise causes simultaneous movement of ring insert 22 and the loading foot 28 to decrease the diameter of the through opening 24.

The threaded shaft 48 of a bolt is threaded into through openings 14 and 24 as shown in FIG. 1. Although this invention is being discussed in relation to a bolt it is considered to be usable with any elongated threaded member such as a screw or stud. If the set screw 44 is turned sufficiently counter clockwise the set screw 44 will actually become spaced from the loading foot 28 and the diameter of the through opening will be at its maximum diameter. In this position the nut body 12 can be easily moved on the threaded bolt shaft 48. If the set screw 44 is turned sufficiently clockwise the set screw 44 will press against the loading foot 28 and move such inward toward the shaft 48 while also simultaneously moving the ring insert 22 toward the shaft 48 and the diameter of the through opening 24 will approach or be at its minimum and the nut body will be locked to the shaft 48. A conventional wrench tool (not shown) will be used to turn the set screw 44. In the locked position the screw threads 16 and 30 will engage the shaft 48 and a three hundred and sixty degree engaging force is produced on the shaft 48. If the user desires to disengage the bolt shaft 48 from the locknut 10, the user only needs to turn set screw 44 counter clockwise.

Ring depressions are formed on both the top surface and bottom surface of nut body 12 with only ring depression 50 being shown on the top surface of the nut body 12. These depressions prevent compression loading interfering with the motion of the loading foot 28 as deformation under heavy clamping loads would produce in the walls of the pocket 18.

The set screw 44 has a recessed face on its inner end to insure that the stress field on the loading foot 28 is not produced from a point source but instead is distributed outward from a circular impression from the set screw 44. The set screw constitutes a force applying device that applies force to the loading foot.

The invention claimed is:

1. A locknut to be applied to a threaded shaft comprising:
    a nut body that has a pair of movable members that surround the threaded shaft;
    a force applying device that is mounted in conjunction with said movable members that can be operated to apply a three hundred and sixty degree engaging force on the threaded shaft thereby locking said nut body to the threaded shaft; and
    one of said movable members comprises a ring insert and the other of said movable members comprises a loading foot mounted within a through opening formed in said ring insert.

2. The locknut a defined in claim 1 wherein:
    said nut body having a pocket located within a through opening of said nut body, said ring insert to be located within said pocket, said ring insert not capable of longitudinal movement but is capable of lateral movement.

3. The locknut as defined in claim 2 wherein:
    said loading foot not capable of longitudinal movement (bot) but is capable of lateral movement toward and away from said ring insert.

4. A locknut comprising:
    a nut body having a first through threaded opening;
    an access opening formed in said nut body and located within said first through threaded opening;
    an arcuate pocket formed in said nut body and located within said first through threaded opening;
    a ring insert having a second through threaded opening, said ring insert being movably mounted within said arcuate pocket, said second through threaded opening being in alignment with said first through threaded opening;
    a loading foot mounted within said second through threaded opening, said loading foot being movable relative to said ring insert, said loading foot having an inner surface which includes a series of screw threads, said screw threads being aligned with said first through threaded opening;
    a screw hole formed in said nut body, a set screw located in said screw hole, said set screw being in contact with said loading foot; and
    a threaded bolt being mounted within said nut body and extending through said first through threaded opening, said threaded bolt being threaded in conjunction with said ring insert and said loading foot, turning of said set screw causes both said loading foot and said ring insert to simultaneously move to decrease the diameter of said second through threaded opening thereby applying an engaging force on said threaded bolt.

5. The locknut as defined in claim 4 wherein:
    said ring insert being only capable of lateral movement relative to said nut body and not capable of longitudinal movement.

6. The locknut as defined in claim 5 wherein:
    said loading foot being only movable laterally relative to said ring insert.

7. The locknut as defined in claim 4 wherein:
    said loading foot being located within said second through threaded opening.

8. The locknut as defined in claim 4 wherein:
    said engaging force being three hundred and sixty degrees on said threaded bolt.

\* \* \* \* \*